United States Patent [19]
Cass et al.

[11] Patent Number: 5,581,637
[45] Date of Patent: Dec. 3, 1996

[54] SYSTEM FOR REGISTERING COMPONENT IMAGE TILES IN A CAMERA-BASED SCANNER DEVICE TRANSCRIBING SCENE IMAGES

[75] Inventors: Todd A. Cass, San Francisco; Eric Saund, San Carlos, both of Calif.

[73] Assignee: Xerox Corporation, Stamford, Conn.

[21] Appl. No.: 632,921

[22] Filed: Apr. 16, 1996

Related U.S. Application Data

[63] Continuation of Ser. No. 353,654, Dec. 9, 1994, abandoned.

[51] Int. Cl.$^6$ ........................................... G06K 9/36
[52] U.S. Cl. ............................. 382/284; 382/294
[58] Field of Search ........................ 282/284, 287, 282/291, 294, 309, 130, 173, 174, 180; 348/262, 264

[56] References Cited

U.S. PATENT DOCUMENTS

| | | | |
|---|---|---|---|
| 3,943,361 | 3/1976 | Miller | 250/236 |
| 3,956,629 | 5/1976 | Gomm et al. | 250/223 |
| 4,797,942 | 1/1989 | Burt | 382/41 |
| 4,878,247 | 10/1989 | Wester-Ebbinghaus | 382/1 |
| 5,010,500 | 4/1991 | Makkuni et al. | 364/521 |
| 5,063,602 | 11/1991 | Peppers et al. | 382/32 |
| 5,140,647 | 8/1992 | Ise et al. | 382/41 |
| 5,298,697 | 3/1994 | Suzuki et al. | 187/131 |
| 5,331,435 | 7/1994 | Scott | 358/479 |
| 5,353,058 | 10/1994 | Takei | 348/363 |

OTHER PUBLICATIONS

Szeliski, R., "Image Mosaicing for Tele-Reality Applications," Digital Equipment Corporation, Cambridge Research Lab., CRL 94/2, May, 1994.

Quentin, S-F., "Controlling Computers by Video," First Year Report & Project Proposal, Jul. 23, 1993, Rank Xerox Limited, Cambridge EuroPARC, UK.

Primary Examiner—Joseph Mancuso
Attorney, Agent, or Firm—R. Christine Jacobs; Tracy L. Hurt

[57] ABSTRACT

A device for registering component image tiles in a scanning system for transcribing, into electronic form, markings on a two-dimensional surface such as a whiteboard. A registration light pattern is projected onto the surface to be imaged. The pattern projected can be chosen to best suite the specific properties of the camera and imaging environment. The pattern markings are processed using perspective transformations to determine the overlap properties of the image tiles and distortion of each tile image, and the resulting data is used to combine the tiles to produce an undistorted composite image of the whiteboard.

5 Claims, 9 Drawing Sheets

SYSTEM FOR REGISTERING COMPONENT IMAGE TILES IN A CAMERA-BASED SCANNER DEVICE TRANSCRIBING SCENE IMAGES

CROSS REFERENCE TO RELATED APPLICATIONS

This is a continuation, of application Ser. No. 08/353,654, filed Dec. 9, 1994, now abandoned.

This application is a related to U.S. Patent application Ser. No. 08/303,929, and U.S. Patent application Ser. No. 08/303,918, each concurrently filed and coassigned.

FIELD OF THE INVENTION

The present invention relates to calibrating a device for producing and image of a scene such as a whiteboard, a desktop, an open book, or a general scene in electronic form.

More specifically, the invention relates to projected alignment patterns for registering component image tiles in a scene scanning system, wherein the system provides a digital composite image to produce a complete, undistorted, high-resolution image of the entire whiteboard.

BACKGROUND OF THE INVENTION

In the present invention, a method is presented for producing high-resolution composite images of surfaces, generally applicable to the task of imaging surfaces which are not too distant from the camera. Examples of particular applications are high-resolution, digital desktop imaging, and high-resolution open book scanners. Another important example application is imaging of a whiteboard surface. In the following discussion, the idea is illustrated by detailed discussion of the application of high-resolution imaging of whiteboards, with the intent that it illustrates the central elements of the invention which may be applied to a more general case.

In collaborative working environments, several users frequently wish to view and manipulate displayed information simultaneously. Whiteboards are widely used to maintain hand drawn textual and graphic images on a "wall-size" surface. The whiteboard medium offers certain properties that facilitate a variety of interactive work practices: markings are large enough to be viewed by several people; markings can be edited by erasing and redrawing; the surface is immobile, so does not get lost, crumpled, torn, or blown by wind; the surface is readily erased, is completely reusable, and (practically) does not wear out. However, one drawback to using a whiteboard is that information is not easily transferred to other media. Thus, it is not currently possible to hold a conversation with someone while maintaining a record of the conversation in text and graphics on a whiteboard and then quickly, easily, and automatically transfer the record to paper or other portable and storable medium.

Existing methods for accomplishing this task are cumbersome, time-consuming, and inconvenient. One can simply transcribe by hand, onto paper, any or all of the text and graphics residing on the whiteboard. This can be time-consuming, and suffers from errors due to mistakes in human reading and writing. Or, one can photograph the whiteboard with a camera. This requires having a camera at hand, introduces the delay of developing the film, can be expensive if an "instant" camera is used, is subject to poor quality rendition due to improper focus and exposure. A camera further usually produces an image of greatly reduced size that can be difficult to read.

Alternatively, "wall-size" sheets of paper, such as poster pads, lead to a relatively permanent and portable record of what was written, but these sheets of paper are large and cumbersome, and do not permit easy erasure during image creation.

A copy-board device provides a writing surface which can be transcribed into paper hardcopy, but these are currently conceived as conspicuous portable whiteboards that displace rather than leverage existing, built-in whiteboards.

The solutions discussed above further do not aid in transferring the image from the whiteboard into an electronically usable form. Concurrently filed U.S. Pat. application Ser. No. 08/303,918 describes a system for scanning a whiteboard of blackboard to capture an image. Such a system works by combining a series of image "tiles", or individual camera shots of portions of the board, into a composite image of the board.

The present invention may be used to provide registration information for combining the image tiles into a composite image. In the present invention, an alignment pattern is projected upon a whiteboard to provide electronic registration and calibration of the tiles of the surface image by a camera-based scanning system, so that a high-resolution electronic image of a scene may be provided without significant distortion.

The present invention further allows such calibration patterns to be projected and processed independent of the user of the scene scanning system. The invention may employ infrared light projection, so that the registration information is invisible to the user of the system.

SUMMARY OF THE INVENTION

The present invention provides a system for scanning scene images into electronic images. The system includes a camera subsystem for capturing the scene image in a plurality of image tiles, each tile capturing a portion of the whiteboard, and a projector for projecting a registration light pattern upon the whiteboard. The present invention also includes a method for registering the relative alignments of image tiles, in which a registration light pattern is projected upon the scene into each tile. The light pattern in each tile is captured, and used to determine alignment of pairs of neighboring tiles. The alignment of each pair of tiles is combined with the alignment information of all the tiles to produce a composite alignment of the entire whiteboard image.

One aspect of the present invention is the ability to project calibration markings on the scene which may be used independently of the scene image to construct a high-resolution electronic image of a scene without significant distortion.

When infrared (IR) light is projected to provide the registration pattern, the registration marks are not visible to distract the user, but may always be present for the system to perform its calibration calculations without requiring other input, such as marks in tile overlap areas, from the user.

The following description, the drawings and the claims further set forth these and other objects, features and advantages of the invention.

DETAILED DESCRIPTION

A. Conceptual Framework

The following is a modification and extension of the invention set forth in the following concurrently filed, coassigned U.S. Pat. application, incorporated herein by reference: U.S. Pat. application Ser. No. 08/303,918.

While the description herein is primarily directed to imaging a board or whiteboard, it will be clear that the current invention is further applicable to imaging more general, near two-dimensional surfaces or "scenes."

B. General Features

Figure 1:
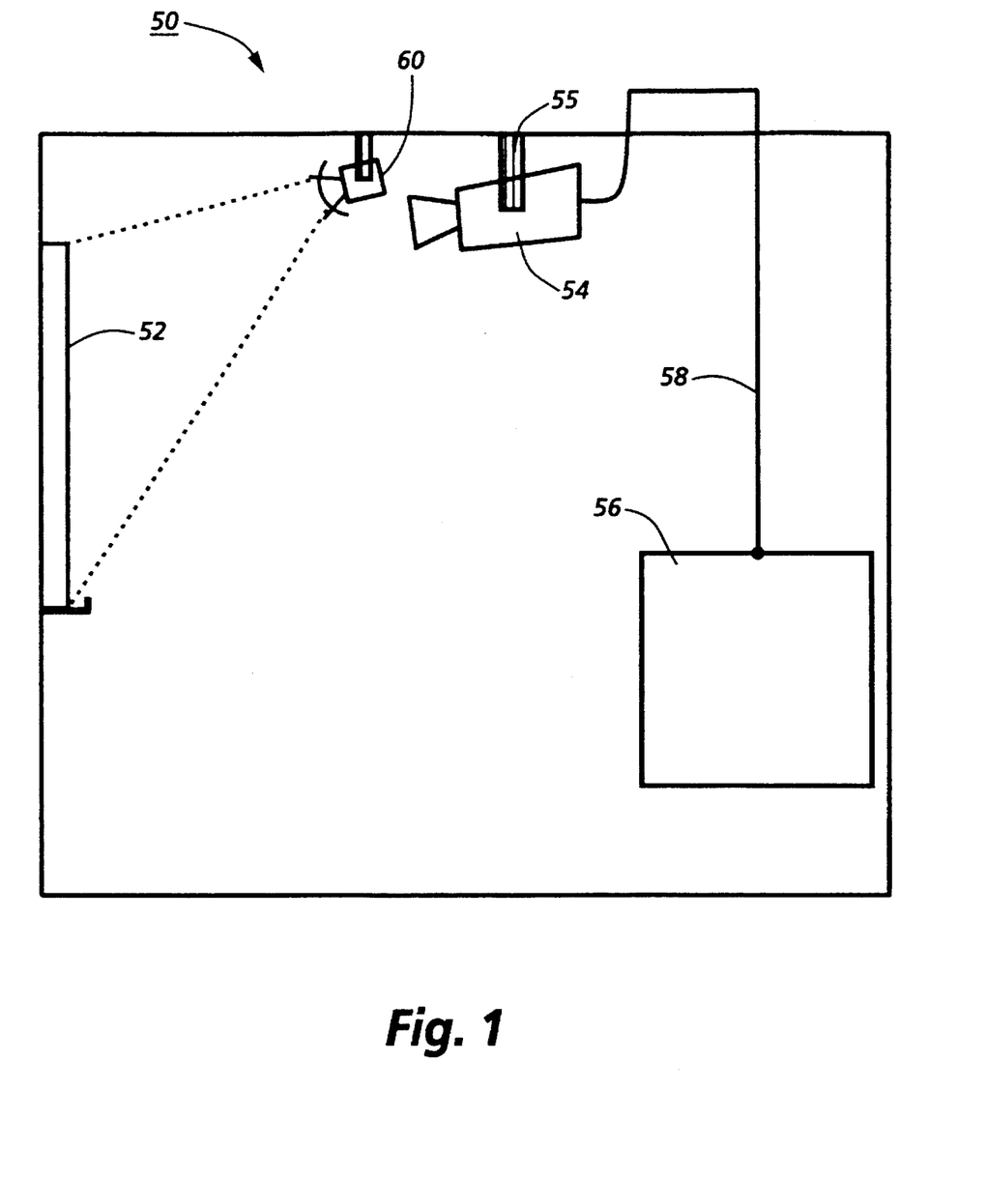
FIG. 1 shows a system including the features of the present invention.

FIG. 1 shows a system 50 including the features of the present invention, in which projected light patterns are used to aid in registration of image tiles in a composite image of a scene. This projected light pattern may be in either the visible or infrared (IR) range.

System 50 comprises an image scene in the form of a whiteboard 52, video camera 54 and computing system 56. Whiteboard 52 accepts markings from a user.

Camera subsystem 54 captures an image or images of the whiteboard, which are fed to computer 56 via a network 58. In general, the resolution of an electronic camera such as a video camera will be insufficient to capture an entire whiteboard image with enough detail to discern the markings on the whiteboard clearly. Therefore, several zoomed-in images of smaller subregions of the whiteboard, called "image tiles," must be captured independently, and then pieced together. Camera subsystem 54 is mounted on a computer-controlled pan/tilt head 55, and directed sequentially at various subregions, under program control, when an image capture command is executed. Camera subsystem 54 may alternately comprise an array of fixed or movable × cameras, each directed at a different subregion or subregions. For the discussion herein, camera subsystem 54 may be referred to as simply camera 54.

The "raw" image tiles will in general overlap one another, contain perspective distortion due to the off-axis viewpoint of the camera, and contain uneven lightness levels across the whiteboard between foreground (written marks) and background (unmarked whiteboard) due to uncontrolled lighting conditions and reflections.

Figure 2:
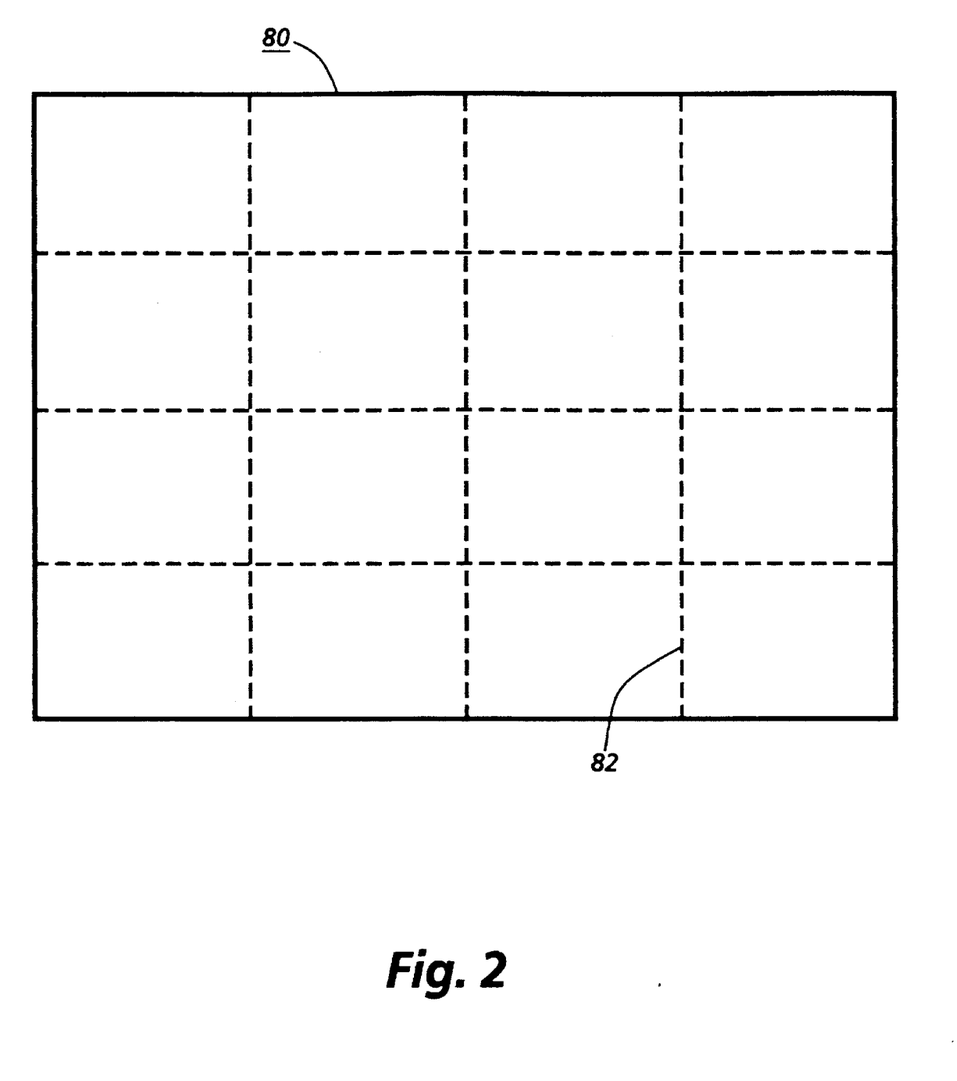
FIG. 2 shows an example grid pattern that may be projected upon a whiteboard.

Also included is a light projecting device 60 which projects a registration pattern, such as a grid of lines or dots, onto the surface being imaged. FIG. 2 shows an example grid pattern 82 that may be projected upon a whiteboard 80. Using this system, video camera 54 may take two sequential images at one camera position—one of the surface illuminated by the projected registration pattern, and one without the pattern. The underlying surface markings are derived conceptually by XORing the images. The pattern projected can be chosen to best suit the specific properties of the camera and the imaging environment.

U.S. Pat. application Ser. No. 08/303,918 described a system in which "landmarks" were surface markings on a board which were used to register and align overlapping image tiles. The current invention deals with a means for automatically generating alignment marks—"landmarks"—by projecting them onto the surface being imaged, such as in the case of a whiteboard.

Figure 3:
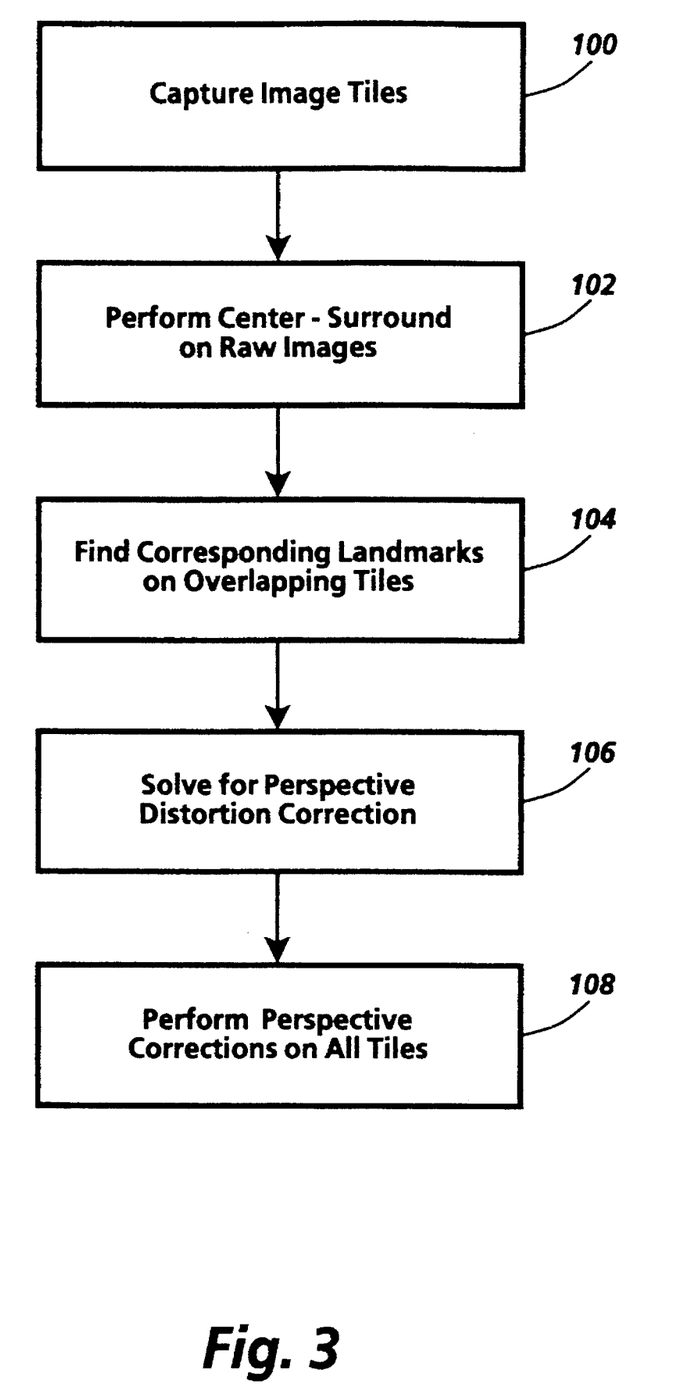
FIG. 3 is a flowchart describing a general method for producing an electronic alignment of a whiteboard from a set of scanned image sections.
Figure 4:
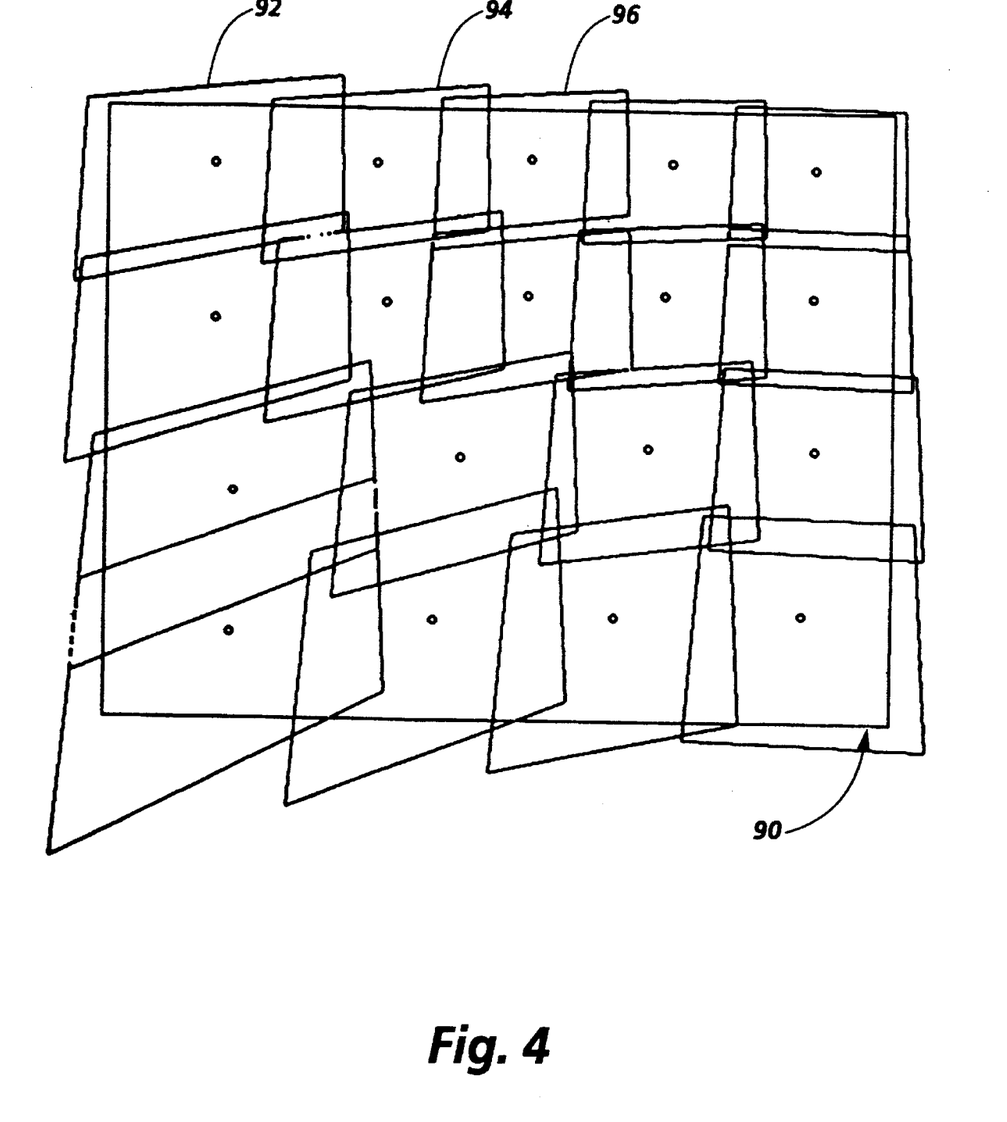
FIG. 4 illustrates image tiles scanned from sections of a whiteboard.

The flowchart of FIG. 3 shows a general method for producing an electronic alignment pattern for the whiteboard for a set of scanned image sections, using the above described projection patterns to register the location of each tile. In step 100, the scanned image sections are captured as "tiles". Each tile is a portion of the image scanned by a camera, as shown in FIG. 4. A whiteboard 90 is captured as a series of tiles 92, 94, etc. The tiles slightly overlap with neighboring tiles, so that the entire image is scanned with no "missing" spaces. The location of each tile is known from the position and direction of the camera on the pan/tilt head when the tile is scanned. The tiles may be described as "raw image" or "camera image" tiles, in that no processing has been done on them to either interpret or precisely locate them in the digital image.

Figure 5:
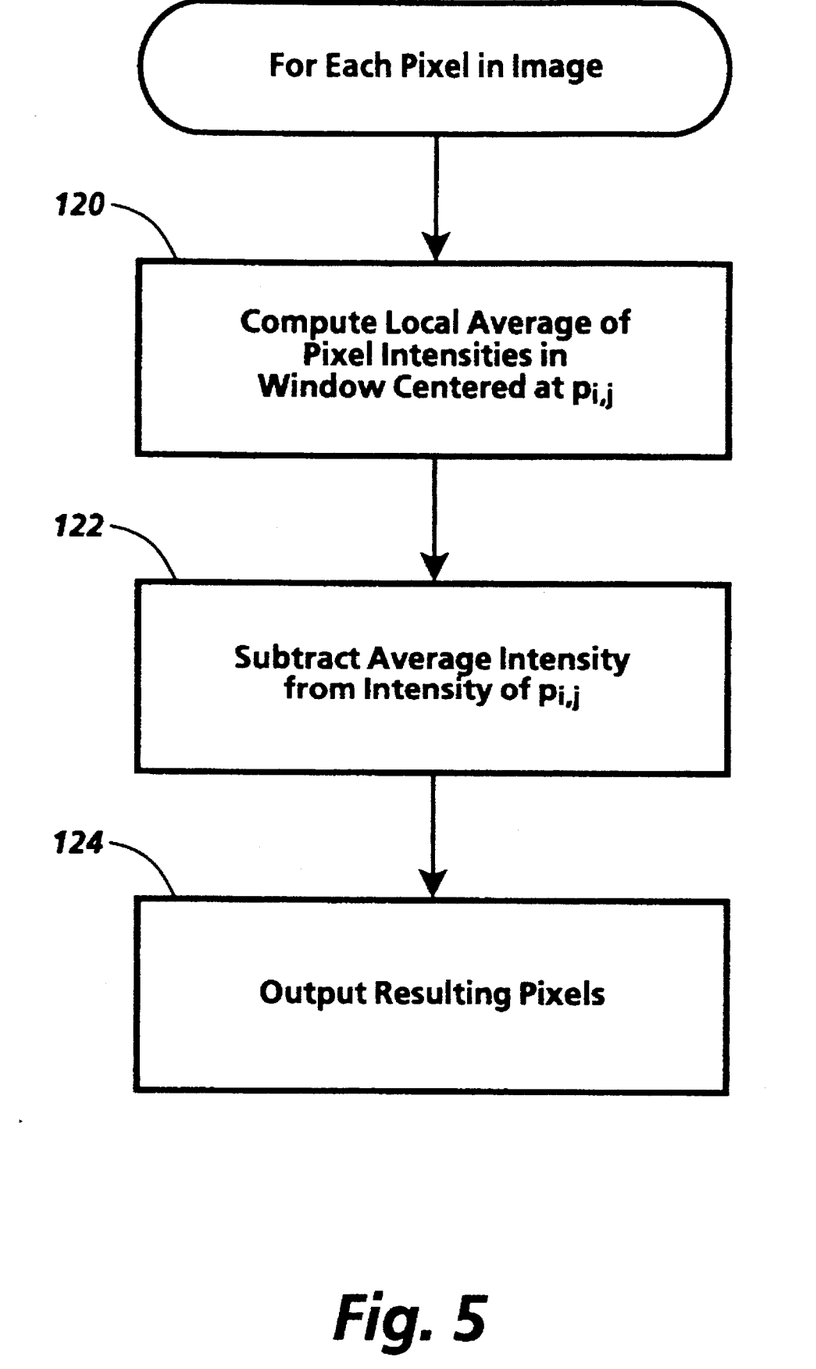
FIG. 5 is a flowchart describing center-surround processing.

Returning to FIG. 3, in step 102 center-surround processing is performed on each camera image tile. Center-surround processing compensates for the lightness variations among and within tiles. Unlike looking for written marks on a whiteboard, as performed in U.S. Pat application Ser. No. 08/303,918, center-surround processing in this step isolates the lightest marks, the projected light pattern, on the whiteboard. Center-surround processing is described in relation to FIG. 5. For each pixel in the image, step 120 computes a local average of pixel intensities in a window, of a prespecified size, centered at $p_{i,j}$. In step 122, the average intensity is subtracted from each $p_{i,j}$. The resulting pixels are output in step 124. The resulting output pixels represent the difference at each pixel between its original value and the average value of pixels in the surrounding area.

Returning again to FIG. 3, step 104 finds corresponding "landmarks" in overlapping tiles, as will be described in relation to FIG. 6. The landmarks are portions of the projected patterns, which are used to provide the correct overlap position of neighboring tiles. Landmarks may be defined by starting points, end points, and crossing points in their makeup.

Landmarks are detected in two stages. The first stage entails the creation of an auxiliary "landmark quality" image indicating the "goodness" of a potential landmark centered at each pixel in the image, where a good landmark provides precise localization in two directions, such as mark 150, and a secondary landmark, such as mark 160, provides localization in only one direction, providing localization in the direction of arrow 165, but less precise localization in the other direction, designated by arrow 163. The second stage is the selection of good landmarks as uniformly as possible within the overlap region between the projection of two image tiles in the Board coordinate system. By controlling the projection of landmarks, it may be assured that most of the detected landmarks will be considered "good."

To obtain the auxiliary landmark quality image, a gradient operator first is applied to the raw image, whereby the rough orientation and magnitude of the gradient are recorded at each pixel, using by techniques that will be well-known to those familiar with computer vision literature.

Local orientation is quantized into four bins. So for each pixel in the image a local histogram is formed giving cumulative gradient magnitude for each of the orientation bins, within a localized neighborhood of each pixel. Note that for good landmarks the histogram will contain large cumulative gradient magnitude in all orientation bins, secondary landmarks will contain large gradient magnitude in at most two bins, and poor or nonexistant landmarks will contain large cumulative gradient magnitude in no bins. Finally, each pixels is scored as to local landmark quality according to:

$$\text{landmark-quality} = v_m v_p + v_m + v_p$$

where $v_m$ is the gradient magnitude in the histogram bin with the greatest cumulative gradient magnitude and $v_p$ is the gradient magnitude in the histogram bin representing the orientation 90 degrees from the bin of $v_m$.

In the second stage of landmark detection the landmark quality image is scanned with the objective of obtaining roughly uniformly distributed locations representing high quality landmarks. The landmark quality image is divided into square patches of predetermined size referred to as the "landmark-radius." Within each such patch, each pixel is given a "weighted-landmark-quality" score by $$\text{weighted-landmark-quality} = \text{landmark-quality} + 2 \text{ landmark-radius} - |d_x| - |d_y|$$

where $d_x$ and $d_y$ are the distance of the pixel to the center of the square patch in the horizontal and vertical directions, respectively. Within each patch, the pixel with the greatest weighted-landmark-quality is found. If the landmark-quality associated with this pixel falls above a predetermined threshold, then this pixel location is accepted as a landmark.

Figure 6:
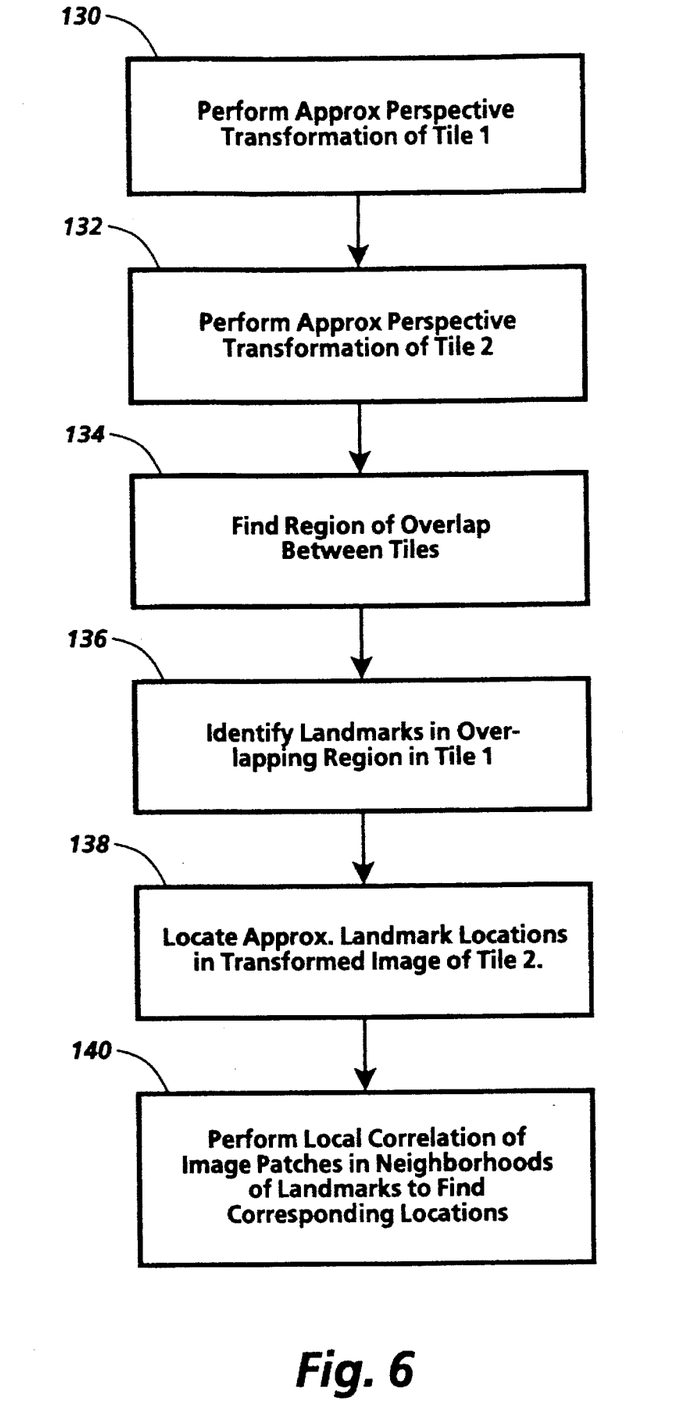
FIG. 6 is a flowchart describing finding corresponding landmarks in overlapping tiles.

FIG. 6 describes finding corresponding landmarks in two overlapping tiles, which shall be referred to as tile 1 and tile 2. In step 130 of FIG. 6, an approximate perspective transformation of tile 1 is performed to determine approximately how the tile maps into whiteboard coordinates. This comes from dead reckoning based on camera calibration and the positioning of the pan/tilt head when this image was captured. The transformation may be determined using a general linear transformation, as described in "Geometric Invariance in Computer Vision," edited by Mundy and Zisserman, ©1992 Massachusetts Institute of Technology, Appendix 23.4.5 –23.4.7, pages 481 –484. Whiteboard coordinates are predefined with respect to the whiteboard. When the camera is calibrated, each tile location is determined in whiteboard coordinates. A similar transformation is performed in step 132 on tile 2.

In step 134, the region of overlap, in whiteboard coordinates, between tiles 1 and 2 is found based on the dead reckoning of the camera position. Landmarks that fall in this overlapping region in the transformed image of tile 1 are identified in step 136, and in step 138 the approximate locations of the landmarks in the transformed image of tile 2 are located.

In step 140, a local correlation is performed on image patches in the neighborhoods of landmarks to find locations in tile 2 corresponding to landmark locations in tile 1. The projected may be chosen to optimize detectability and utility for localization, for example providing localization in two directions. Examples include projecting a regular grid of lines, dots, crosses, with spacing chosen relative to the size of the image tiles and the size of their overlap to facilitate registration of overlapping tiles. If the grid spacing is chosen larger than twice the accuracy of the raw estimate of the location of the image tiles, then corresponding alignment marks in the overlap region between two overlapping tiles can be found unambiguously.

An alternative if the tiling configuration is known in advance is to use, instead of a general grid configuration, a configuration of alignment patterns tailored to the particular tiling pattern and projected into the overlap region between each pair of overlapping tiles. If the grid spacing is chosen larger than twice the accuracy of the raw estimate of the location of the image tiles, then corresponding alignment marks in the overlap region between two overlapping tiles can be found unambiguously. This pattern in the simplest case could consist of k landmarks, say points, where k is chosen in order that the transformation between the two images can be computed. For example, in the case of a plane perspective transformation, the correspondence between k=4 points is sufficient to compute the transformation between them. As mention earlier, the alignment marks can be found for a given tile location by successively taking two images, one with the alignment pattern and one without, and computing the point-wise difference of these images, identifying points with a large difference as the alignment pattern. Thus the pattern is turned on and off once per tile.

Returning once more to FIG. 3, step 106 solves for perspective distortion corrections that optimize global landmark mismatch functions, as will be described in more detail in FIG. 7. This step corrects for errors that occur in the dead reckoning of the tile location in the image.

Figure 7:
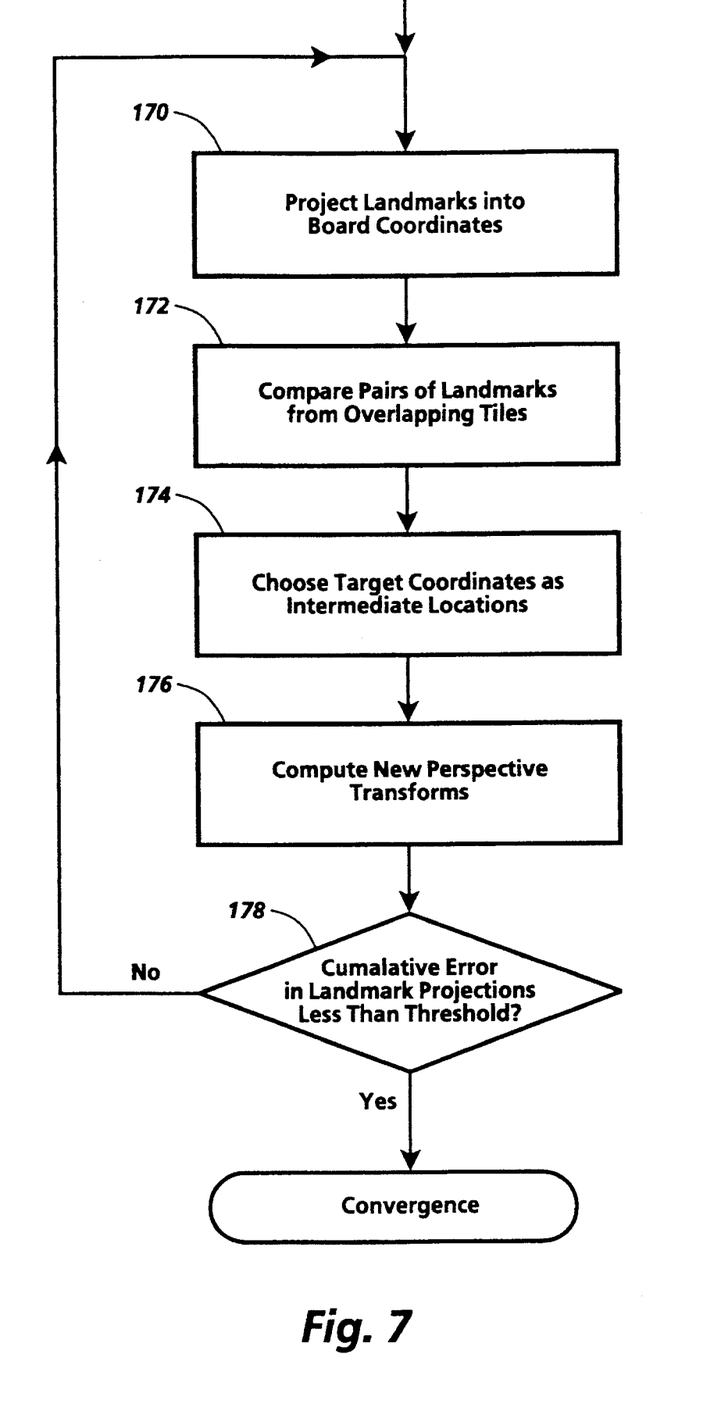
FIG. 7 is a flowchart describing solving for perspective distortion corrections that optimize global landmark mismatch functions
Figure 8:
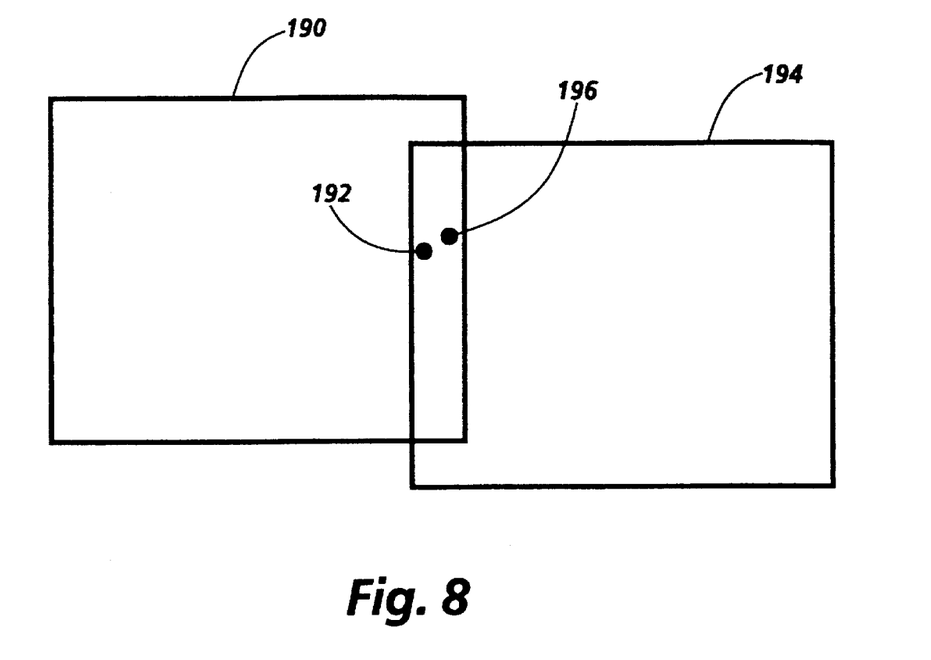
FIG. 8 shows a landmark as it appears offset in two neighboring tiles.
Figure 9:
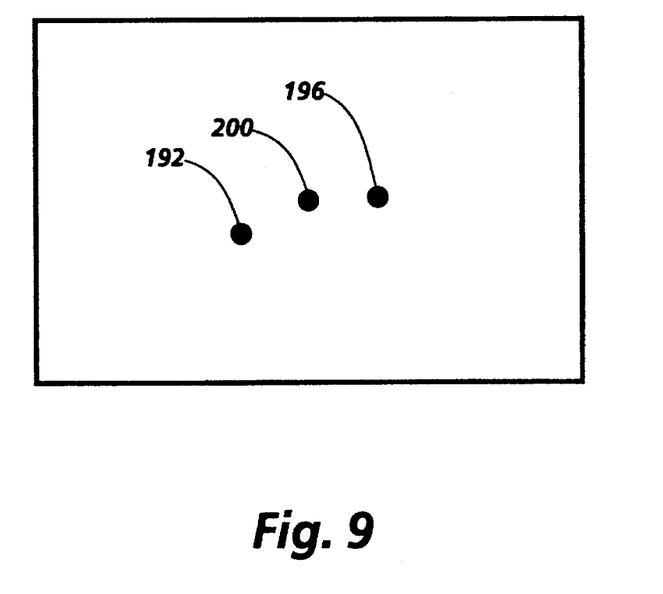
FIG. 9 shows offset landmarks, and an intermediate midpoint.

In step 170 of FIG. 7, the landmarks are projected into whiteboard coordinates using the current estimate of the perspective transformation. The first time this is performed, the dead reckoning data from the camera location is used to provide the current estimate. In step 172, the locations of pairs of landmarks from overlapping tiles are compared, and in step 174, intermediate target locations are chosen midway between the pairs of landmarks. These steps are illustrated in FIGS. 8 and 9. In FIG. 8, a first tile 190 has a landmark 192 identified in its overlap area. In the second tile 194, the corresponding landmark 196 is located. As shown in FIG. 9, landmarks 192 and 196 are slightly offset in their projections into whiteboard coordinates. The images of both tiles are then transformed to correlate the landmark location more closely with this target location.

Step 176 computes new perspective transforms using a least squares objective measure, which optimally project landmarks in camera coordinates into new target locations in whiteboard coordinates. The transformation may be determined using a general linear transformation in homogeneous coordinates, as described in Mundy and Zisserman. In the formula below, X, Y, and Z are the target coordinates of the landmark in whiteboard coordinates, found by comparing landmarks from overlapping tiles x, y, and z are camera coordinates.

$$\begin{bmatrix} x \\ y \\ z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} X \\ Y \\ Z \end{bmatrix}$$

The image coordinates u and v may be found by $$u = x/z \text{ and } v = y/z$$

where $t_{33} = 1$.

Solving for the transformation parameters t, an over-constrained system of linear equations is constructed.

$$\begin{bmatrix} & & & & & & & \\ & & & & & & & \\ & & & & & & & \\ X_i & Y_i & 1 & X_i & Y_i & 1 & -X_i u_i' & -Y_i u_i' \\ -X_i & -Y_i & -1 & X_i & Y_i & 1 & -X_i v_i' & -Y_i v_i' \\ & & & & & & & \\ & & & & & & & \\ & & & & & & & \end{bmatrix} \begin{bmatrix} t_{11} \\ t_{12} \\ t_{13} \\ t_{21} \\ t_{22} \\ t_{23} \\ t_{31} \\ t_{32} \end{bmatrix} =$$

$$\begin{bmatrix} \cdot \\ \cdot \\ \cdot \\ u_i + v_i \\ -u_i + v_i \\ \cdot \\ \cdot \\ \cdot \end{bmatrix}$$

Each pair of rows in the matrix covers the $i^{th}$ projection mark. The transformation parameters may now be solved for, using singular value decomposition.

Returning to FIG. 7, in step 178 the new cumulative error in the landmark projections, determined as the difference between the current squared error and the squared error from the last iteration, are tested to fall within a previously determined threshold.

Finally, returning to FIG. 3, step 108 performs perspective corrections on all the tiles using the perspective transformation determined in step 106. Having made the corrections to the image tiles and locating the transformed tiles in whiteboard coordinates, the whiteboard may then be processed to create an electronic representation of the image on the whiteboard. The corrections for each tile may be combined to provide an electronic registration pattern for the tiles, so that scanning systems, such as described in previously incorporated U.S. Pat. application Ser. No. 08/303,918, may combine the image tiles correctly for further processing.

The source of the projected alignment pattern could be as simple as a conventional slide projector where the projected pattern is given by an image on a slide. This light source could be a regular visible light, or it could be a light in the infrared range. A low-power laser which is split into a grid using an optical beam splitter could provide points of IR or visible light, or alternatively the laser light pattern could be dynamically produced via optics and electronics as in the case of laser printers, where a single or multliple laser beam is scanned rapidly in a 2D pattern.

Figure 10:
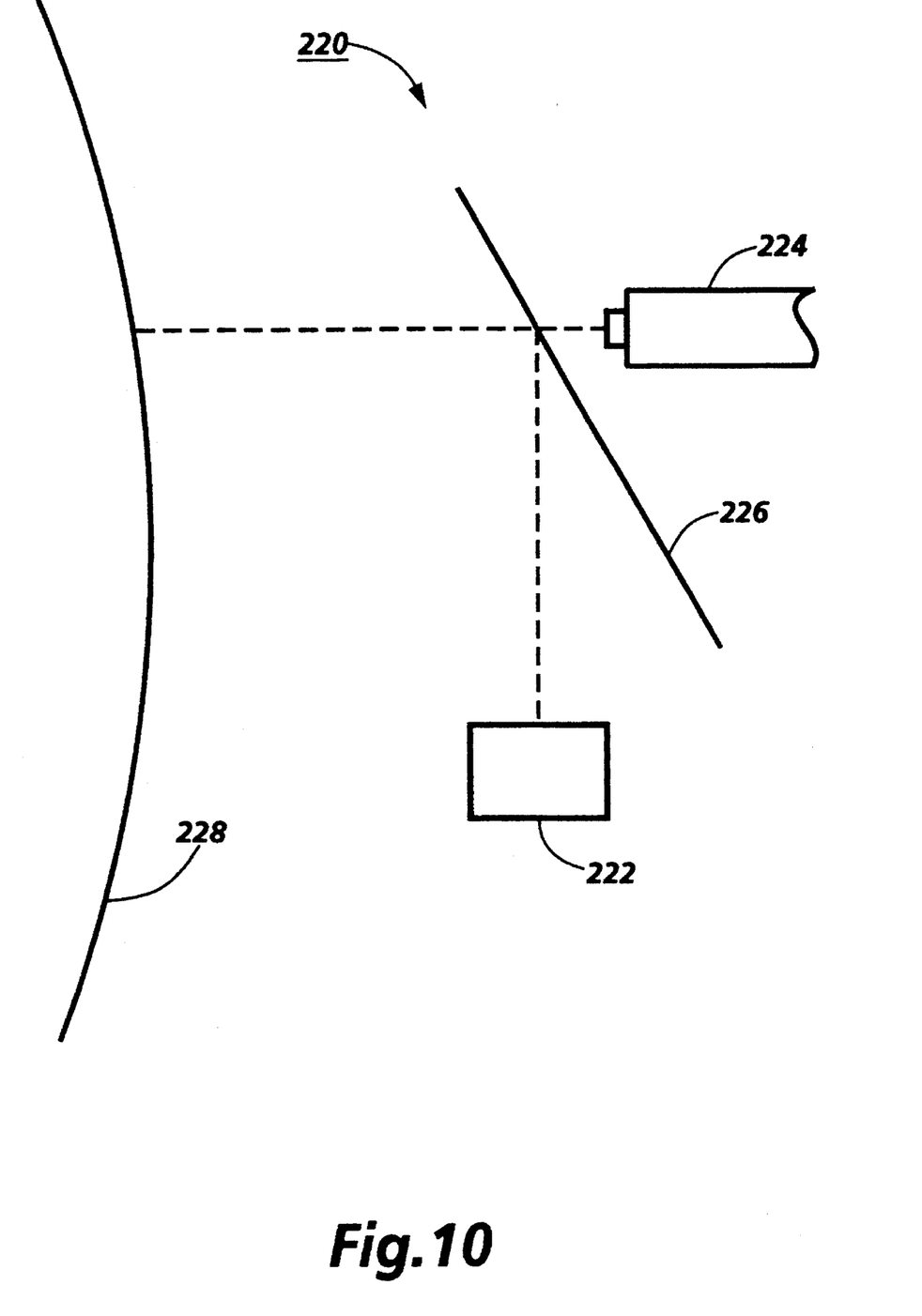
FIG. 10 shows a system including means to minimize distortion of the alignment pattern.

In order to minimize the distortion of the alignment pattern due to surface slope in directions non-parallel to the image plane, the optical axis of the alignment pattern projector should be as close as possible to the optical axis of the camera. For example, FIG. 10 shows a system 220 with a surface 228 to be imaged. Projector 222 and camera 224 share the same optical axis and optical center using a half-silvered mirror 226.

C. Miscellaneous

This technique described herein is useful in situations when marks on the whiteboard are not adequate to effectively provide registration details —either the marks are too sparse or too dense, or are ambiguous or difficult to resolve. By projecting artificial marks that are visible to the system, but not distracting to the human users, the system may more easily match the image tiles to one another.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method for providing a complete undistorted computational representation of an image on a surface, the method comprising the steps of:

a) projecting a light pattern upon the image, the light pattern including a multiplicity of lightmarks, each lightmark having a neighborhood;

b) capturing a multiplicity of image tiles using at least one camera subsystem, each of the image tiles including a portion of the image and at least a one of the lightmarks, each image tile having an overlapping area for each adjacent image tile overlapped by the image tile;

c) converting the image tiles into a computational format;

d) for each image tile, identifying the overlapping areas;

e) correcting distortions of the image tiles, including perspective distortion, to produce a single undisturbed, computational representation of the image by the substeps of:

1) identifying the lightmarks within the overlapping areas;

2) performing local correlations of image patches in the neighborhoods of the lightmarks within the overlapping areas to identify locations in each image tile of the lightmarks within the overlapping areas;

3) projecting the lightmark locations into surface coordinates;

4) for each pair of overlapping, adjacent image tiles, comparing corresponding pairs of lightmarks within the overlapping area common to the pair of overlapping, adjacent image tiles;

5) for each pair of lightmarks within the overlapping area common to a pair of overlapping, adjacent image tiles, choosing target coordinates at a location intermediate to the surface coordinates of each of the pair of lightmarks within the overlapping area common to the pair of overlapping, adjacent image tiles;

6) computing perspective transforms for each image tile using the target coordinates for the lightmarks within the overlapping areas;

7) repeating substeps 1)–6) until convergence upon locations of lightmarks within the overlapping area of each image tile that represent a cumulative error in surface coordinates of the lightmarks within the overlapping areas of each image tile that is less than a threshold amount.

2. The method of claim 1 wherein step e3) comprises the steps of: for each pair of overlapping, adjacent image tiles:

A) finding a first location of a first liqhtmark of the lightmarks within the overlapping area common to the pair of overlapping, adjacent image tiles, the first location being within a surface co-ordinate system and being found given a location of the first lightmark within a first co-ordinate system associated with a first tile of the pair of overlapping, adjacent image tiles;

B) finding a second location of the first lightmark within the surface co-ordinate system given a location of the first lightmark within a second co-ordinate system associated with a second tile of the pair of overlapping adjacent, image tiles; and wherein step e6) comprises the step of:

for each pair of overlapping adjacent image tile:

using the first location and the second location of the first lightmark to compute the perspective transform.

3. The method of claim 2, wherein step e6) includes the steps of:

computing a perspective transform of said first tile to obtain the first location of the first lightmark;

computing a perspective transform of said second tile to obtain the second location of the first lightmark; and determining a difference between the first location and second location of said first lightmark.

4. The method of claim 2, wherein step e2) includes the steps of:

for each pair of overlapping, adjacent image tiles:

performing center-surround processing on said first tile to identify lightmarks; and performing center-surround processing on said second tile to identify lightmarks.

5. An automatic system for capturing in computational form an undisturbed image content of an image comprising:

a) a surface upon which the image is provided;

b) at least one camera subsystem for capturing the image in a matrix of image tiles, each of the image tiles including at least a portion of the image, each of the image tiles having an overlapping area that overlaps an adjacent image tile;

c) a projection subsystem for projecting a registration pattern upon the image, the registration pattern including a multiplicity of lightmarks, each of the overlapping areas including at least one of the lightmarks;

d) a processor combining the image tiles to create in computational form the undisturbed image content of the image corrected for perspective distortion by the step of:

1) for each pair of adjacent image tiles, identifying a first overlapping area of a first image tile of the pair of adjacent image tiles corresponding to a second overlapping area of a second image tile of the pair of adjacent image tiles;

2) identifying a first lightmark in the first overlapping area corresponding to a second lightmark in the second overlapping area;

3) finding a projection of the first liqhtmark at a first surface coordinate location in the first image tile;

4) finding a projection of the second liqhtmark at a second surface coordinate location in the second image tile;

5) correcting perspective distortion between the first surface coordinate location and the second surface coordinate location; and generating corrected surface coordinates for the first lightmark and the second lightmark;

e) memory coupled to the processor, the memory storing instructions for the processor and storing in computation form the undisturbed image content of the image.

* * * * *